United States Patent [19]

Solomon

[11] 4,063,626

[45] Dec. 20, 1977

[54] SILENT RATCHET

[75] Inventor: Donald F. Solomon, Newport Beach, Calif.

[73] Assignee: Jo-Line Tools, Inc., Anaheim, Calif.

[21] Appl. No.: 694,776

[22] Filed: June 10, 1976

[51] Int. Cl.[2] .............................................. F16D 41/16

[52] U.S. Cl. ........................................ 192/43.1; 81/63

[58] Field of Search .................... 192/43.1; 81/63, 63.2

[56] References Cited

U.S. PATENT DOCUMENTS

| | | | |
|---|---|---|---|
| 2,188,846 | 1/1940 | Rueb | 81/63 X |
| 2,981,389 | 4/1961 | Kilness | 192/43.1 X |
| 3,044,591 | 7/1962 | Kilness | 192/43.1 |
| 3,369,416 | 2/1968 | Kilness | 192/43.1 X |
| 3,677,102 | 7/1972 | Simonetta | 81/63 X |

*Primary Examiner*—Allan D. Herrmann

*Attorney, Agent, or Firm*—Fulwider, Patton, Rieber, Lee & Utecht

[57] ABSTRACT

A ratchet is provided in which a friction brake ring is employed to engage a pawl with the ratchet teeth in an annular ring or hinge extending from a ratchet tool handle. The friction brake ring carries the pawl into engagement when the tool handle is rotated in the direction in which it is desired to turn a workpiece. A spring within the ratchet returns the pawl to a position in which it is disengaged entirely when pressure on the tool handle in the rotational direction of engagement is released. Thus, the return of the tool handle before a subsequent engaging stroke is accomplished silently and without the characteristic clicking of the ratchet teeth of the hinge passing over the pawl.

5 Claims, 5 Drawing Figures

FIG. 1
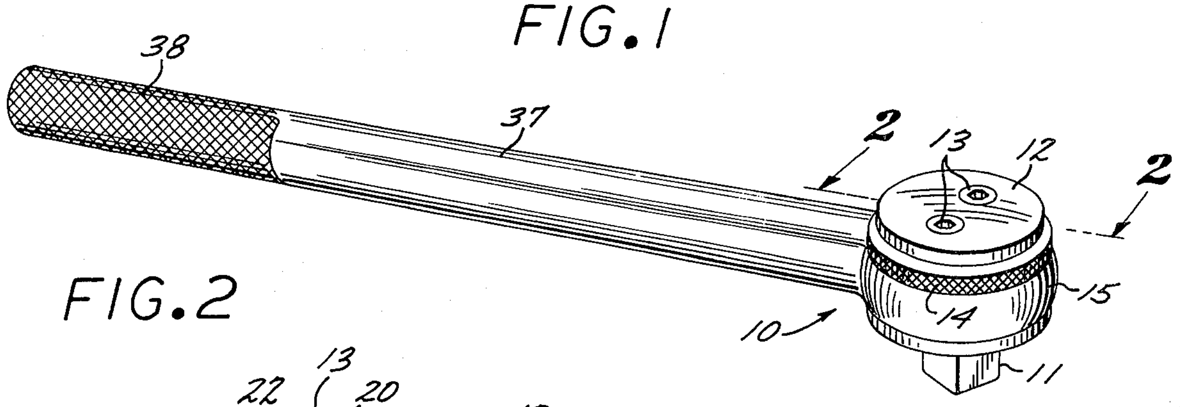
FIG. 2
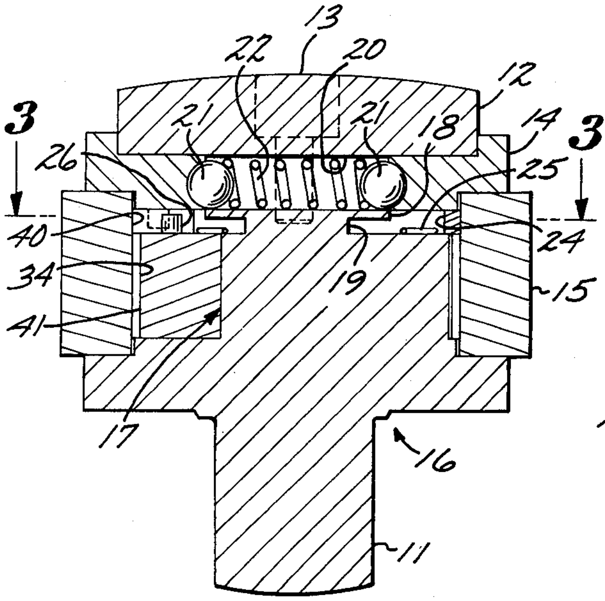
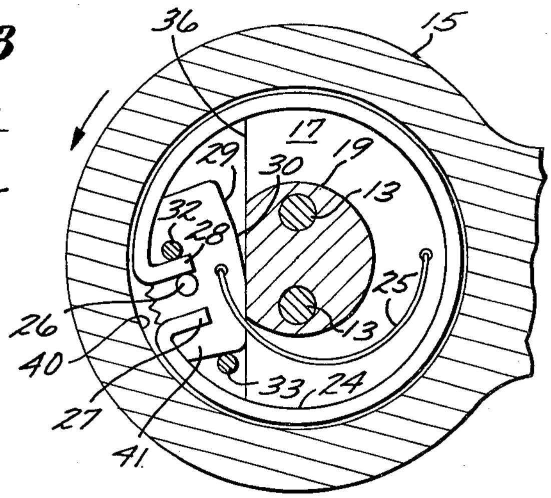
FIG. 3
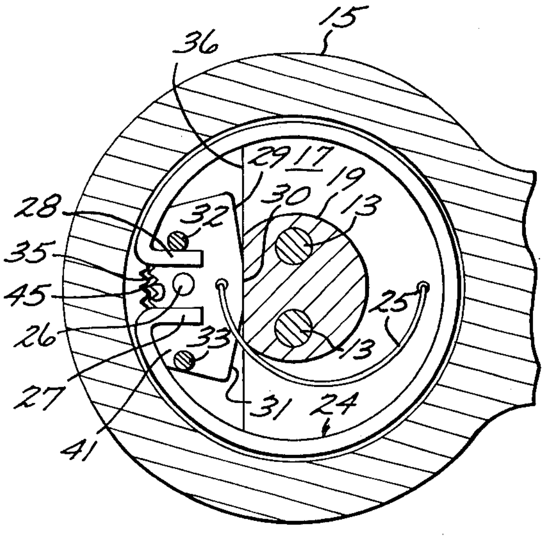
FIG. 4
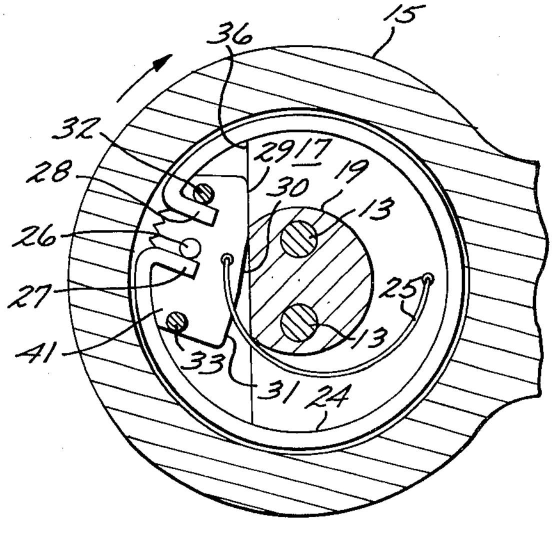
FIG. 5

SILENT RATCHET

FIELD OF THE INVENTION

This invention relates to a ratcheting tool for use as a hand tool for socket wrenches and the like.

Ratcheting tools have been used extensively as hand tools in association with socket wrenches and other mechanical adapters for engaging various types to workpieces. Conventional ratchet tools, however, have one characteristic in common. During return of the ratchet tool handle following a power stroke to turn a workpiece, the ratchet teeth of the annular ring or hinge at the end of the work handle produce a characteristic clicking sound as they pass over the teeth of a pawl located within the ratchet head. While for most operations this clicking is not particularly objectionable, there are certain instances where it is highly desirably to eliminate this characteristic noise of conventional ratchet tools. One application where the suppression of such noise is extremely important, for example, is in military vessels, especially submarines and other subsurface craft. In these applications, small sounds travel extensively in water and can be picked up by enemy sound detection equipment. Consequently, the elimination of even minor noises, such as the clicking of a ratchet tool, is highly desirable.

The operating principle of a hand held ratchet tool is that a rotational force is exerted on a lever arm in the form of a work handle to exert torque on a workpiece. The torsional force acts about the same axis as the axis of rotation of the work handle. Ratchet tools are designed for reversible engagement. That is, rotation of the work handle in one direction will cause engagement of mating ratchet teeth within the ratchet tool to transmit torque to a workpiece. Counter-rotation of the work handle will disengage the ratchet teeth so that the work handle merely backs up for subsequent forward rotation in the direction in which it is desired to turn the workpiece. As previously noted, it is the backing up of the ratchet handle that results in the characteristic clicking noise in conventional ratchet tools.

SUMMARY OF THE INVENTION

It is an object of the present invention to provide a ratchet tool which can be used to engage and turn a workpiece in silence. It is particularly desirable to eliminate the characteristic clicking sound of conventional ratchet devices employed as socket wrenches screw drivers, and the like.

The invention may be more clearly explained by reference to the accompanying drawings.

BRIEF DESCRIPTION OF THE INVENTION

FIG. 1 is a perspective view of the ratcheting tool of this invention.

FIG. 2 is a sectional view taken along the lines 2—2 of FIG. 1.

FIG. 3 is a sectional view taken along the lines 3—3 of FIG. 2 showing the pawl in the counterclockwise engagement position.

FIG. 4 is a similar view showing the pawl in the intermediate position.

FIG. 5 is a similar view showing the pawl in the clockwise engagement position.

DETAILED DESCRIPTION OF THE INVENTION

Refering now to FIG. 1 there is illustrated a ratchet tool 10. The ratchet tool 10 includes a work handle having a knurled grip 38, and a shank 37 terminating in an annular ring or hinge 15. The annular ring 15 has an interior surface divided into a friction bearing section 40 and a toothed section 34 coaxial therewith. The section 34 is equipped with radially interiorally directed ratchet teet 45. Conversely, the bearing surface 40 is relatively smooth, although it is not greased or lubricated since it is important that this surface provide some degree of friction.

Adjacent to the annular ring 15 is a torque transmitting member 16 which is rotatable about its own axis. The torque transmitting member has one element 11 shaped to engage a workpiece, typically a socket from a socket wrench set. The torque transmitting member 16 also has a coaxial driver element 17 defined in the shape of a cylinder longitudinally disected by an axially extending planar bearing wall 36. This cross sectional configuration of the coaxial driver element 17 is best illustrated in FIGS. 3, 4 and 5. The driver element 17 has an intermediate neck section 19 of reduced cross sectional area. Above the neck section 19 is a larger disk shaped section 18. A transverse channel 20 passes laterally through the disk shaped section 18 and bisects its upper surface.

A detent means is located within the channel 20 and if formed with two spheres 21 positioned at opposite ends of the channel 20. The spheres 21 are separated from each other and biased radially outward from the driver element 17 by means of a compressed spring 22 located in the channel 20.

The annular ring 15, or hinge as it is sometimes called, encircles the driver element 17 so that the ring 15 and the driver element 17 are positioned in mutually coaxial arrangement to define a cavity between the interior surfaces of the ring and the planar bearing wall 36.

A pawl 41 is located within the cavity and has an arcuate surface equipped with ratchet teeth 35. These ratchet teeth 35 of the pawl 41 are engageable with the ratchet teeth 45 of the annular ring 15 at the toothed section 34 thereof. Opposite the arcuate section of the pawl 41 containing the teeth 35 there is an opposing bearing surface of overall convex configuration. This bearing surface is formed of a planar interior segment 30 flanked by planar end segments 29 and 31. Each of the segments 29, 30 and 31 is alternatively positionable in contact with the planar bearing wall 36. The ratchet teeth 35 of the pawl 41 may thereby be alternatively engaged with the ratchet teeth 45 on the ring 15 for clockwise and counterclockwise rotation of the ring 15. More specifically, the pawl 41 is engaged for counterclockwise rotation when it is in the position indicated in FIG. 3 with the planar end segment 31 in contact with the planar bearing wall 36. Conversely, the pawl 41 is engaged for clockwise rotation when in the position depicted in FIG. 5 with the planar end segment 29 in contact with the planar bearing wall 36. When the pawl 41 is in the position indicated in FIG. 4 the teeth 35 are totally disengaged from the teeth 45 of the annular ring 15. In this intermediate position, the pawl 41 lies with its planar interior segment 30 positioned in contact with the planar bearing wall 36. The teeth 45 of the toothed section 34 of the annular ring 15 do not ratchet pass the pawl 41 when the pawl 41 is in this intermediate position. Rather, there is total clearance between the teeth as illustrated so that the annular ring 15 rotates silently relative to the pawl 41 when the pawl 41 is in this intermediate position.

An actuating pin 26 extends upwardly in a longitudinal direction from the pawl 41. A friction brake ring 24 encircles the greater portion of the driver element 17 at the neck section 19 thereof. Preferably, the friction brake ring 24 forms an arc of about 350° about the driver element 17, as illustrated. The friction brake ring 24 is biased radially outward against the friction bearing section 40 of the annular ring 15. The friction brake ring 24 passes atop the pawl 41 and above the toothed section 34 of the annular ring 15. The ends of the friction brake ring 24 terminate in inwardly extending flanges 27 and 28 bracketing the actuating pin 26.

A directional indexing member 14 is positioned in annular disposition about the driver element 17. In the indexing member 14 two sets of opposing radially extending detent depression are formed. These depressions are coplanar with the transverse channel 20 extending across the upper surface of the section 18 of the driver element 17. Two detent spheres 21 are designed to extend into these depressions when both of the depressions in a set in the annular indexing member 14 are aligned with the channel 20. Thus, the indexing member 14 may be rotated to one of two indexing positions. These two positions are the positions of relative rotation of the indexing member 14 at which the sets of detent depressions are aligned with and adjacent to the channel 20 in the driver element 17. The spheres 21 are biased into engagement with depressions aligned therewith by the spring 22. Thus, the spheres 21 tend to hold the indexing member 14 in one of the two indexing positions.

Two engagements protrusions 32 and 33 are spaced from each other and are carried by the indexing member 14. These engagement protrusions 32 and 33 extend from the indexing member 14 for selective lateral engagement with the flanges 27 and 28 of the brake ring 24 to limit the rotational movement of the brake ring 24 relative to the indexing member 14.

A spring means 25 is located within the annular space around the driver element 17 which exists by virtue of the neck section 19 of the driver element 17. The spring 25 is an arcuate spring fastened to one side of the driver element 17 and extending to beyond the opposite side thereof, to pass across the plane of the planar bearing wall 36 where it is fastened to the pawl 41. The spring 25 is designed to urge the pawl 41 toward the intermediate position of FIG. 4.

The various operational elements of the ratchet tool 10 are held together by a cap 12 through which machine screws 13 extend for secured engagement with the driver element 17.

In the operation of the invention, if it is desired to engage a workpiece on the element 11 of the torque transmitting member 16 for rotation in a counterclockwise direction, the annular indexing member 14 is rotated counterclockwise. With sufficient counterclockwise rotation, the annular indexing member 14 is secured in position by engagement of the spheres 21 with corresponding depressions in the annular indexing member 14. At this point, the protrusions 32 and 33 extending toward the pawl 41 from the indexing member 14 are in the position indicated in FIGS. 3 and 4. The annular ring 15 is then rotated by means of the work handle in a counterclockwise direction. The friction brake ring 24 is carried with the annular ring 15 by virtue of the frictional forces that act between the friction brake ring 24 and the friction bearing section 40 of the annular ring 15. As the friction brake ring 24 is rotated in a counterclockwise direction, the flange 28 engages the actuating pin 26 extending upward from the pawl 41. This engagement during continued rotation moves the pawl 41 against the influence of the spring 25 from its intermediate postion in which the planar interior segment 30 rests against the planar bearing wall 36, to a position for engagement in a counterclockwise direction of rotation as indicated in FIG. 3. In this position, the planar end surface 31 of the pawl 41 rests against the planar bearing surface 36. Also in this position, the ratchet teeth 35 of the pawl 41 are engaged with the ratchet teeth 45 of the tooth section 34 of the annular ring 15. Further counterclockwise rotation of the annular ring 15 causes a counterclockwise rotation of the workpiece.

When the handle terminating in the annular ring 15 is to be backed off or returned in preparation for a subsequent power stroke in the direction of engagement, the annular ring 15 is rotated in a clockwise direction. This clockwise rotation of the friction brake ring 24, which is initially carried with the annular ring 15, released the actuating pin 26 of the pawl 41. When the actuating pin 26 is released, the arcuate spring 25 pulls the pawl 41 back to its intermediate position, as indicated in FIG. 4. A continued clockwise rotation of the annular ring 15 brings the flange 28 of the friction brake ring 24 into contact with the protrusion 32 extending from the indexing member 14. The protrusions 32 and 33 from the indexing element 14 are held in position with respect to the driver element 17 by means of the detent mechanism previously described. Accordingly, continued clockwise rotation of the annular ring 15 results in the protrusion 32 engaging the flange 28 so that the friction brake ring 24 can no longer rotate in a clockwise direction. Thereafter, although the annular ring 15 may continue to be rotated in a clockwise direction, the friction brake ring 24 is held immobile with the friction bearing section 40 sliding across the outer surface of the ring 24.

When the clockwise return stroke has been completed, a subsequent counterclockwise power stroke is initiated. This again causes the flange 28 to force the actuating pin 26 counterclockwise so that the pawl 41 again assumes the position of counterclockwise engagement depicted in FIG. 3. The transition between the positions of FIGS. 3 and 4 is thus repeated for as many strokes as are required for the particular workpiece being rotated.

When it is desired to index the ratchet tool of this invention for engagement during clockwise rotation, the indexing member 14 is rotated in a clockwise direction relative to the driver section 17. This disengages the spheres 21 from one set of detent depressions, and engages them in the other set of detent depressions once the indexing member 14 has been turned clockwise to a sufficient extent. When in this position, the protrusions 32 and 33 are in the positions depicted in FIG. 5. A clockwise rotation of the annular ring 15 with the indexing member 14 in this position results in the engagement of the actuating pin 26 by the flange 27 of friction brake ring 24. This overcomes the bias of the spring 25 and causes the pawl 41 to assume the position indicated in FIG. 5, where it is engaged for clockwise rotation of the annular ring 15. Once the clockwise rotation of the annular ring has ceased and the counterclockwise return stroke is initiated, the flange 27 no longer holds the actuating pin 26 in the position of FIG. 5. Consequently, the spring 25 draws the pawl 41 back to its intermediate position of total disengagement of the teeth 35 of the pawl with respect to the teeth 45 of the annular ring 15.

It can be seen that the angle through which the pawl 41 rotates in changing between an intermediate and an engaged position must not be to great or jamming of the pawl 41 within the cavity is likely to occur. Preferably, the angle between adjacent planar segments of the bearing surface of the pawl is between about 2° and 10°. The preferred angle of alignment of adjacent ones of the segments 29,30, and 31 is about 5°.

The foregoing description and illustration of the embodiment of the silent ratchet tool of this invention which has been depicted should not be considered as limiting in scope. Rather, the scope of the invention is defined in the claims which are appended hereto.

I claim:

1. A ratcheting tool for applying torque to a workpiece comprising:

a. a torque transmitting member rotatable about its own axis and having one element shaped to engage a workpiece and having a coaxial driver element defined in the shape of a cylinder longitudinally disected by an axially extending planar bearing wall and having an intermediate neck section of reduced cross sectional area, and defining a transverse channel therein at a longitudinal distance from said neck section, b. a work handle terminating in an annular ring having an interior surface divided into a friction bearing section and a toothed section coaxial therewith, the latter section being equipped with radially interiorally directed ratchet teeth, wherein said annular ring and said driver element are positioned in mutually coaxial arrangement to define a cavity between the interior surface of said ring and said planar bearing wall, c. a pawl located within said cavity and having an arcuate surface equipped with ratchet teeth engageable with said ratchet teeth of said annular ring and having an opposing bearing surface of overall convex configuration and formed with a planar interior segment flanked by planar end segments each segment being alternatively positionable in contact with said planar bearing wall, whereby said ratchet teeth may be engaged for clockwise and counterclockwise rotation of said ring when said pawl is alternatively in clockwise and counterclockwise engagement positions with a respective one of said planar end segments lying in contact with said planar bearing wall, and whereby said ratchet teeth may be disengaged entirely when said pawl is in an intermediate position with said planar interior segment positioned in contact with said planar bearing wall, d. an actuating pin extending longitudinally from said pawl, e. a friction brake ring encircling the greater portion of said driver element at the neck section thereof and biased radially outward against said friction bearing section of said annular ring and passing atop said pawl and having inwardly extending flanges that bracket said actuating pin, whereby rotation of said annular ring causes the frictional forces at said friction bearing section thereof to carry said friction brake ring in the same direction of rotation to cause one of said flanges to engage said actuating pin to move said pawl from its intermediate position to one of its engaged positions, f. a directional indexing member positioned in annular disposition about said driver element and defining two sets of opposing radially extending detent depressions coplanar with and alternatively positionable adjacent to said transverse channel of said driver element, g. dual engagement protrusions spaced from each other and carried by said indexing member and extending therefrom for selective lateral engagement with said flanges to limit the rotational movement of said brake ring relative to said indexing member, h. detent means located within said channel and biased radially outward from said driver element to selectively engage either of said sets of detent depressions in said indexing member, and i. spring means located within an annular space around said neck section of said driver element and secured to said pawl and said driver element and designed to urge said pawl toward said intermediate position.

2. The ratcheting tool of claim 1 wherein said spring means is an arcuate spring fastened to one side of said driver element and extending to beyond the opposite side thereof to pass across the plane of said planar bearing wall where it is fastened to said pawl.

3. The ratcheting tool of claim 1 wherein said detent means includes two spheres positioned at opposite ends of said channel and separated from each other and biased radially outward from said driver element by a compressed spring located in said channel.

4. The ratcheting tool of claim 1 wherein each of said planar segments of said bearing surface of said pawl lies at an angle of about 5° with respect to any adjacent planar segments.

5. The ratcheting tool of claim 1 wherein said friction brake ring forms an arc of about 350° about said driver element.

* * * * *